Patented July 23, 1946

2,404,357

UNITED STATES PATENT OFFICE 2,404,357

COATED METHYL METHACRYLATE POLYMER ax Fredrick Bechtold, Wilmington, Del., assignor to E. I. du Pont de Nemours & Company, Wilmington, Del., a corporation of Delaware No Drawing. Application October 25, 1943, Serial No. 507,591

9 Claims. (Cl. 117—65)

This invention relates to methyl methacrylate polymer and, more particularly, to improving the scratch resistance of the surface of methyl methacrylate polymer sheets and the like.

Methods heretofore proposed for modification of the surface of synthetic resins such as methyl methacrylate polymer to improve scratch resistance include (1) the application of substances having two or more polymerizable olefinic groups per molecule to the surface to be treated, (2) condensation of volatilized hard substances on the surface, and (3) the application of solutions of metal silicates to the surface, followed by the precipitation of $SiO_2.xH_2O$, then leaching out the soluble portion of the silicate. Method 1 is limited with respect to the scratch resistance attainable because of the inherent softness of the organic coating materials used. The other two methods of film deposition, besides being inconvenient to control, yield films that are porous and too weak to be well suited as scratch resistant coatings.

An object of the present invention is to provide an economical and practical method of improving the scratch resistance of the surface of methyl methacrylate polymer. A further object is to provide coatings for methyl methacrylate polymer sheets and the like, which coatings have high scratch resistance and retain this property as well as clarity and smoothness upon exposure to the weather. Other objects will be apparent from the description of the invention given hereinafter.

The above objects are accomplished according to the present invention by applying to the surface of a methyl methacrylate polymer body a solution comprising ethyl silicate hydrolyzed with an amount of water equal to at least 15% of the weight of the ethyl silicate, and a vinyl acetate polymer in a proportion of 1 part, by weight, to 1-99 parts of silica content of the solution, drying the surface, and then pressing the surface against a rigid surface at an elevated temperature and pressure to cure the coating thus formed and bond it to the surface of methyl methacrylate polymer.

More particularly, the invention is carried out by making up the solution of hydrolyzed ethyl silicate and vinyl acetate polymer, either by forming a hydrolyzed ethyl silicate solution first, allowing it to age, and then mixing it with a solution of the vinyl acetate polymer, or mixing all of the components of the solution at one time, without prior hydrolysis of the ethyl silicate, and then allowing this solution to age; applying this solution to the surface of the methyl methacrylate polymer, preferably by immersing the methyl methacrylate polymer sheet or the like in the solution and then withdrawing it. Thereafter, the coating formed on the methyl methacrylate polymer surface is cured and bonded to that surface by pressing the coated surface with appreciable pressure against a rigid surface such as a smooth glass or metal sheet while maintaining the coated surface at an elevated temperature.

The commercially available technical grade ethyl silicate, which is chiefly tetraethyl ortho silicate, is suitable for use in the preparation of the coating solutions of the present invention. Likewise, good commercial grades of vinyl acetate polymers are suitable.

The following examples illustrate specific embodiments of the invention, all parts being given by weight unless otherwise noted:

Example I

This example shows the use of substantially non-hydrolyzed polyvinyl acetate and hydrolyzed ethyl silicate in a hot-pressed coating on a methyl methacrylate polymer surface.

Technical grade ethyl silicate (100 parts) is hydrolyzed by stirring in 48 parts of ethyl alcohol and 44 parts of 0.1 normal hydrochloric acid. The temperature rises spontaneously to a maximum of about 60° C. within about 5 minutes. Stirring is discontinued and the solution is permitted to age until use. The coating solution is then made up by mixing the following materials in the amounts and order indicated:

| | Parts |
|---|---|
| A 10% solution of polyvinyl acetate (medium viscosity) in denatured alcohol | 90 |
| Glacial acetic acid | 300 |
| Ethyl alcohol | 110 |
| The hydrolyzed ethyl silicate solution at the age of 5 days | 300 |

A panel of methyl methacrylate polymer sheeting is dipped in the coating solution for 2 minutes, then drained and dried in the air at 35% relative humidity for 8 minutes. The coated sheet is then placed between sheets of chromium-plated polished steel which just cover all areas of the coated sheet to be cured. This sandwich is inserted in a mold with the same shape as the sheet in order to prevent large changes in the dimensions of the sheet during curing. The coating is cured by inserting the sandwich-mold assembly between the heated platens (155° C.) of a hydraulic press. A pressure of 1110 pounds per square inch is applied immediately to the sandwich by closing the platens rapidly. Due to heat lost to the mold, the platens cool to about 140° C. in a few minutes, but the platen temperature returns to 150° C. within 5 minutes, due to heat input regulated by a temperature control unit. At this point, the heat is turned off and the mold-sandwich assembly and platens are cooled to 80° C. within 25 minutes. At the end of this period, the pressure is released and the sandwich disassembled. The clear silica/vinyl resin-coated methyl methacrylate sheeting obtained is very resistant to scratching when scoured with wet Carborundum powder. The panel withstands immersion in water for 76 days before the surface cracks.

*Example II*

This example shows the coating of methyl methacrylate polymer with a hot-pressed silica/hydrolyzed vinyl acetate polymer in which the vinyl acetate is modified with a relatively large amount of another organic material, ethylene, by interpolymerization.

A coating solution is prepared by mixing the following ingredients in the order and amounts indicated:

|   | Parts |
|---|---|
| A solution (4.5% by weight) of hydrolyzed ethylene/vinyl acetate polymer (mole ratio 1/1.1), prepared by refluxing the polymer in ethanol-water (80/20 by weight) | 160 |
| Glacial acetic acid | 240 |
| A hydrolyzed ethyl silicate solution prepared as in Example I and aged 1 day | 240 |

A panel of methyl methacrylate polymer sheeting is dipped in the coating solution for 2 minutes, drained and dried for 15 minutes in the air at 36% relative humidity, then assembled into a sandwich and a mold for hot-pressing as in Example I. In this example, the press platens are initially at 200° C., are at 190° C. after 5 minutes and are cooled to 90° C. within 20 minutes. The pressure being maintained on the coated sheeting during curing (1110 pounds per square inch) is released and the cured silica/vinyl resin-coated plastic is removed. Immersion of the coated sheet in water at 75° C. for 1 hour has no effect on the initially perfect surface. The surface is unusually resistant to scratching with wet Carborundum powder.

*Example III*

This example shows the use of a highly hydrolyzed, completely water-soluble polyvinyl acetate in a hot-pressed silica-containing coating, which, upon curing, becomes completely water-insoluble.

A coating solution is prepared by mixing the following ingredients in the order and amounts indicated:

|   | Parts |
|---|---|
| A 4.5% solution of a 90%-hydrolyzed, low viscosity polyvinyl acetate in water | 100 |
| A hydrolyzed ethyl silicate solution prepared as in Example I and aged 4.5 hours | 150 |
| Glacial acetic acid | 150 |

A methyl methacrylate polymer sheet is dipped in the coating solution for 2 minutes, dried 11 minutes in the air at 34% relative humidity. The curing is carried out as in Example II. The resulting silica/polyvinyl alcohol-coated sheet shows unusually high resistance to scratching with wet Carborundum powder. The surface is unaffected by immersion in water at 75° C. for 1 hour.

*Example IV*

This example illustrates the use of a polyvinyl acetate hydrolyzed to an intermediate degree in a hot-pressed silica-containing coating.

A coating solution is prepared by mixing the following ingredients in the order and amounts indicated:

|   | Parts |
|---|---|
| A 5% (by weight) solution of 52%-hydrolyzed high viscosity polyvinyl acetate in ethanol-water (70/30 by weight) | 150 |
| A hydrolyzed ethyl silicate solution prepared as in Example I and aged 44 hours | 150 |
| Ethyl alcohol | 75 |
| Glacial acetic acid | 225 |

Methyl methacrylate polymer sheeting is dipped in the coating solution for 2 minutes, then dried 15 minutes in the air at 19% relative humidity. The coated sheet is cured as in Example I except that the press platens are initially at 175° C., are maintained at about 175° C. for 10 minutes and are cooled to 25° C. within 5 minutes. The resultant coated sheet is glossy and transparent, is substantially non-scratched by scouring with wet diatomaceous earth and withstands exposure to air at 60° C. for at least 50 days without apparent effect. Outdoor exposure of coated panels during both winter and summer months does not alter the initial optical perfection through weathering or scratching of the surface even though air-borne dust is frequently rubbed off with a dry cloth.

*Example V*

This example illustrates the use of a relatively large amount of a partially hydrolyzed polyvinyl acetate polymer in a silica-containing hot pressed coating, as well as the hydrolysis of ethyl silicate without the initial presence of a common solvent for the ester and water.

Ethyl silicate (100 parts) is hydrolyzed by agitation with 44 parts of 0.1 normal hydrochloric acid. The reaction mixture evolves heat then cools to room temperature within about 1 to 2 hours. The coating solution is made by mixing the following ingredients in the order and amounts indicated:

|   | Parts |
|---|---|
| The 52%-hydrolyzed polyvinyl acetate solution used in Example V | 210 |
| The hydrolyzed ethyl silicate solution prepared as described and aged 21.75 hours | 97.5 |
| Ethyl alcohol | 77.5 |
| Glacial acetic acid | 225 |

A sheet of methyl methacrylate polymer is dipped in the coating solution for 2 minutes, then drained and dried for 15 minutes in the air at 17% relative humidity. The coated sheet is cured as in Example V. The resultant coated methyl methacrylate polymer is unblemished, has excellent resistance to scratching when scoured with wet diatomaceous earth and resists exposure in air at 60° C. for at least 35 days without crazing.

*Example VI*

This example shows the curing of a silica/partially hydrolyzed polyvinyl acetate coating at high temperature.

A coating solution is prepared by mixing, in the order and amounts indicated, the following ingredients:

| | Parts |
|---|---|
| The 52%-hydrolyzed polyvinyl acetate solution as described in Example IV | 120 |
| Hydrolyzed ethyl silicate solution prepared as in Example I, and aged 72 hours | 160 |
| Ethyl alcohol | 95 |
| Glacial acetic acid | 225 |

A sheet of methyl methacrylate polymer is dipped in the coating solution for 7.5 minutes, drained and dried in the air at 29% relative humidity for 20 minutes. The coating is cured by hot-pressing as in Example I, except that the initial temperature of the platens is 220° C., the platens are maintained between 209° C. and 223° C. for 10 minutes and are then cooled to 25° C. within 5 minutes. The silica/resin-coated polymer prepared in this manner has a glass-like appearance, is substantially non-scratched when scoured vigorously with steel wool, resists hot water (60° C.) for 360 hours before crazing, endures the Kline accelerated weathering test (exposure to a sun lamp for 20 hours, and exposure to water mist for two 2-hour periods per day) for 500 hours without damage and withstands outdoor exposure during both winter and summer months without apparent changes.

*Example VII*

This example illustrates the use of a coating solution prepared without prior hydrolysis of the ethyl silicate.

A coating solution is prepared by mixing the following ingredients in the order and amounts given:

| | Parts |
|---|---|
| The 52%-hydrolyzed polyvinyl acetate solution as described in Example IV | 200 |
| 0.1 normal hydrochloric acid | .61 |
| Ethyl alcohol | 225 |
| Glacial acetic acid | 375 |
| Ethyl silicate | 139 |

A sheet of methyl methacrylate polymer is dipped in the coating solution (age 16.8 to 67.2 hours) for 7.5 minutes, is drained and dried for 20 minutes at 31%–35% relative humidity, and is then hot-pressed as in Example I, except that the platens are initially at room temperature, are heated to 175° C. within 15 to 20 minutes, are maintained at an average of 175° C. for 10 minutes and are cooled to room temperature in 5 minutes. Coated methyl methacrylate polymer sheeting prepared in this manner is clear, very resistant to scratching when scoured with abrasive powders, withstands water at 60° C. for 144 hours before crazing and withstands exposure in the carbon arc Fade-Ometer for at least 500 hours without apparent effect.

*Example VIII*

This example illustrates a convenient method for preparing a large quantity of coating solution containing hydrolyzed ethyl silicate and partially hydrolyzed vinyl acetate and the process of coating and curing large panels of methyl methacrylate sheeting using an oil filled autoclave.

A hydrolyzed ethyl silicate solution is prepared by mixing 640 parts of ethyl silicate, 320 parts of denatured alcohol, 1.5 parts of concentrated hydrochloric acid and 269 parts of distilled water. A solution of 52%-hydrolyzed polyvinyl acetate is prepared by soaking 105.3 parts of the polymer in 1400 parts of denatured alcohol for two days, then adding 600 parts of water with agitation until the polymer is in solution. The coating solution is prepared by mixing the following ingredients in the order and amounts given:

| | Parts |
|---|---|
| The hydrolyzed ethyl silicate solution at the age of 1 hour | 1200 |
| The partially hydrolyzed vinyl acetate solution | 900 |
| Glacial acetic acid | 640 |
| Denatured alcohol | 80 |

A sheet of heat-treated methyl methacrylate sheeting plasticized with 10% dibutyl phthalate is cleaned with a lint-free cloth dampened with methanol. The sheet is immersed in the coating solution, which has aged 64 to 90 hours at the time of immersion, for a period of 15 minutes, after which it is withdrawn by a mechanical wind-up at the uniform rate of 8 inches per minute. The coated sheet is withdrawn into air at 27° C., 20% relative humidity, and is permitted to drain and dry for 20 minutes.

The dried coated resin sheet is then mounted between clean, dry glass plates of the same dimensions as the resin. This sandwich is wrapped in paper and placed in a flexible bag capable of being evacuated and capable of withstanding the action of hot oil under pressure. The bag is evacuated to about 25 inches of mercury, sealed off and placed in an autoclave heated and cooled by circulating oil. The bag-sandwich assembly is subjected to the following hot-pressing cycle:

| Operation | Time required | Initial temp. | Final temp. | Oil pressure |
|---|---|---|---|---|
| | *Minutes* | °*F.* | °*F.* | *Lbs./sq. in.* |
| Heating | 5 | 100 | 300 | 200 |
| Run | 30 | 300 | 300 | 200 |
| Cooling | 15 | 300 | 125 | 200 |

The sandwich is removed from the bag and allowed to cool further in the room air. After about 1 minute the units of the sandwich disassemble spontaneously due to differences in thermal contraction.

The silica/partially hydrolyzed vinyl acetate coated methyl methacrylate resin obtained in this manner is transparent and has the surface smoothness of the glass against which it was pressed. It is not scratched when cleaned with ordinary cleaning powders such as pumice and diatomaceous earth, and strongly resists scratching when scoured with steel wool. The appearance of the surface is not changed by soaking the entire panel in water at 60° C. for 300 hours.

*Example IX*

This example illustrates the preparation of a coating solution containing ethyl silicate prehydrolyzed with 20% of its weight of water, and containing 70 parts SiO₂ per 30 parts of partially hydrolyzed vinyl acetate polymer.

Ethyl silicate (300 parts) is hydrolyzed by mixing with 228 parts of denatured alcohol (5.27% H₂O by weight), then adding slowly with agitation 48 parts of 0.1 normal hydrochloric acid. A solution of 52% hydrolyzed polyvinyl acetate is prepared by dissolving the dry polymer (210.6 parts) in 2800 parts of denatured alcohol and 1200 parts of water. The final coating solution is prepared by mixing the following ingredients in the order and amounts given:

| | Parts |
|---|---|
| The partially hydrolyzed polyvinyl acetate solution | 360 |
| The hydrolyzed ethyl silicate solution used at the age of 96 hours | 280 |
| Denatured alcohol | 80 |
| Glacial acetic acid | 200 |

A sheet of non-plasticized methyl methacrylate resin is immersed in the coating solution for 5 minutes, then is withdrawn vertically at the rate of 8 inches per minute into an atmosphere of 25% relative humidity at 78° F. After drying in this atmosphere for 30 minutes, the sheet is assembled between glass plates and cured as in Example VIII, except that the maximum temperature of 300° F. is maintained for but 20 minutes instead of 30 minutes.

Large sheets of SiO₂/resin coated polymethyl methacrylate prepared in this manner are unusually free from optical defects, and have high scratch resistance and exposure resistance.

It will be understood that the above examples are merely illustrative and that the invention broadly comprises improving the scratch resistance of methyl methacrylate polymer surfaces by applying thereto a solution comprising hydrolyzed ethyl silicate and a vinyl acetate polymer, drying the surface, and curing the coating thereon and bonding it to the surface by pressing the coated surface against a rigid surface with pressure and at an elevated temperature.

The invention is applicable to surfaces of either unmodified or modified methyl methacrylate polymer, the particular modification of the methyl methacrylate polymer, within reason, being substantially immaterial. Although the examples show the use of ethyl silicate and this alkyl silicate is preferred, other alkyl silicates may be employed in place of ethyl silicate.

The amount of water used in the hydrolysis of the ethyl silicate must be such that, as the ester progressively hydrolyzes and condenses into a polymer in the presence of suitable solvents, a single solution phase is maintained throughout the process, especially in the drying and hot-pressing step in which solvents and water are being eliminated from the solution, and the reaction of the condensing (dehydrating) silicic acid structure with partially hydrolyzed vinyl acetate, or ester interchange with the non-hydrolyzed vinyl acetate polymer, is possible.

It has been found that the minimum amount of water for the hydrolysis of the ethyl silicate in the present invention is, for practical purposes, 15% by weight of the ethyl silicate although to obtain a coating of satisfactory scratch resistance a minimum of 17.5% water is desirable unless particular attention is paid to favorable catalyst concentration and the hydrolysis is effected at elevated temperature together with rather prolonged aging of the ethyl silicate solution before use. It is preferred to use at least 20% of water since increasing the amount of water increases the scratch resistance of the resultant coating, at least up to 20% of water. From 20% to 100% of water, by weight of the ethyl silicate, the scratch resistance of the coating is not noticeably improved and the hydrolysis with more than 100%–150% of water causes the hydrolyzate to be difficultly compatible with some vinyl acetate polymers although substantially completely hydrolyzed polyvinyl acetate, i. e., polyvinyl alcohol, is compatible with ethyl silicate hydrolyzed with over 200% of water. Usually, ethyl silicate hydrolyzed with 20%–75%, by weight thereof, of water is most satisfactory.

It is not essential for a solvent for the ethyl silicate, such as ethanol, methanol, propanol, acetone, or the like, to be present initially in the hydrolysis of the ethyl silicate. However, it is preferred to dilute the ethyl silicate/water mixture with ethanol or other solvent initially since the resulting solution ages more slowly; the use of a proportion of alcohol up to 100%, by weight of the ethyl silicate, or even higher, is advantageous.

A relatively high concentration of a catalyst is desirable for the hydrolysis of the ethyl silicate when an efficient common solvent for water, tetraethyl ortho silicate and the hydrolysis products, is not present. This accelerates dissolution and prevents precipitation of silicic acid (SiO₂.xH₂O) due to a high degree of local hydrolysis and polymerization. For this reason it is convenient to use 0.1 normal hydrochloric acid as the source of both water and catalyst. However, with efficient agitation, 0.01 normal hydrochloric acid may be used and, with an efficient common solvent present such as ethanol, the reaction proceeds satisfactorily without the use of catalyst. Among the catalysts suitable for this hydrolysis reaction are the mineral acids such as hydrochloric, phosphoric, and sulfuric acid, and non-volatile organic acids such as oxalic and maleic, or even weaker and more volatile organic acids such as acetic and formic acids.

The age of the hydrolyzed ethyl silicate when used to prepare the coating solutions of the present invention has been found to be important in the production of scratch resistant methyl methacrylate polymer surfaces that are initially craze-free and remain optically perfect despite weathering. This seems to be related to the rate of the hydrolysis of the ethyl silicate and the rate of polymerization (condensation) of the product. These factors in turn are related to the amount of water, the amount and nature of the solvents and catalysts, if any, present, as well as the temperature, order of mixing, and agitation during the hydrolysis.

It has been found, in general, that there is an initial period in the life of a hydrolyzing and polymerizing ethyl silicate solution in which it is difficult to prepare coating solutions that yield initially craze-free, scratch resistant coatings. This period is followed by a relatively long period in which satisfactory coatings are attained with reasonably small amounts of partially hydrolyzed polyvinyl acetate present as a coating constituent. In the final period of the life of the hydrolyzed ethyl silicate solution, it again becomes increasingly difficult to use it in the preparation of coatings which are not initially crazed. Gelation of the solution follows at this point. In addition to the tendency for the production of crazed coatings in the initial and final periods, the hydrolyzed ethyl silicate solution during these periods yields coatings that have low adhesion to the surface being treated, especially if drying occurs in an atmosphere of high relative humidity.

For convenience, the length of the period in which the silica-containing solution can be used to prepare coatings with satisfactory properties, is called its "useful age." The useful age of hydrolyzed ethyl silicate solutions has been observed to vary from a few hours to over several weeks, depending on the method and nature of hydrolysis. In the examples a satisfactory aging for numerous specific instances has been given and will serve as a guide to those skilled in the art; however, for other specific circumstances a few simple tests would have to be made to determine the precise limits of the useful age.

An essential component of the coating solution of this invention is the vinyl acetate polymer. As shown in the examples, unmodified polyvinyl acetate hydrolyzed anywhere from substantially zero to substantially complete hydrolysis may be used; likewise, wide variation in the relative viscosity of the polyvinyl acetate is permissible. It has been found that, when large amounts of polyvinyl acetate hydrolyzed to the extent of 75% to 100% are used in the coating solutions, special precautions are sometimes necessary to insure good adhesion of the coating to the methyl methacrylate polymer surface. Drying of the coating in a controlled atmosphere or predipping the base polymer in a suitable softening agent, such as glacial acetic acid, followed by brief drying before dipping in the coating solution, have given satisfactory results in such cases. On the other hand, non-hydrolyzed polyvinyl acetate, which yields coatings with excellent adhesion, apparently does not cross link as completely and as irreversibly with the silicic acid as do the partially hydrolyzed polyvinyl acetates. This results in slightly inferior scratch resistance and weather resistance in the coatings. Usually polyvinyl acetate hydrolyzed from 20% to 75% will be employed and it is preferred to use polyvinyl acetates that are hydrolyzed from 45% to 55% (that is from 45% to 55% of the acetyl groups have been removed) for the optimum combination of scratch resistance, adhesion, and weather resistance.

The present invention is not restricted to the use of unmodified vinyl acetate polymer in the coating solution as certain chemical modifications of the vinyl acetate polymer are possible with retention of excellent coating properties. For example, ethylene/vinyl acetate interpolymers with a mole ratio of 1/20 can be used directly without hydrolysis. Also, completely hydrolyzed ethylene/vinyl acetate interpolymer with a mole ratio of 1/1 to 1/3.3 may also be used. In general, stable interpolymers containing vinyl acetate in appreciable proportion can be substituted for unmodified polyvinyl acetate in the coating solutions of the present invention, provided that a satisfactory solvent vehicle can be found which will bring the resin and the hydrolyzed ethyl silicate into a suitable solution that can be dried out and hot-pressed to give final complete compatibility of the silica and resin phases.

The proportion of vinyl acetate polymer to hydrolyzed ethyl silicate used depends on the relative importance of scratch resistance, weather resistance, faultless appearance, and flexibility without cracking, desired in the coated methyl methacrylate polymer surface. Useful coating solutions are obtained when using a proportion anywhere within the range of 1 part of vinyl acetate polymer to 1–99 parts of hydrolyzed ethyl silicate calculated as $SiO_2$ although generally 1.5 to 9 parts of the ethyl silicate to 1 part of vinyl acetate polymer will be used.

Coatings containing 1 part of vinyl acetate polymer to 99 down to 6 parts of the ethyl silicate (calculated as $SiO_2$) are preferred for highest scratch resistance. To obtain both high scratch resistance and durability upon exposure to weather, as well as freedom from crazing and interference colors, the use of about 2–6 parts of the ethyl silicate per 1 part of vinyl acetate polymer is preferred. At the same coating thickness, the flexibility of the coatings without cracking can be increased with some sacrifice in scratch resistance by the use of about 2 to 1.5 parts of the ethyl silicate to 1 part of vinyl acetate polymer. There is still some improvement in the scratch resistance of methyl methacrylate polymer surfaces combined with high flexibility without cracking with coatings containing as low as 1.5 to 1 part of ethyl silicate to 1 part of vinyl acetate polymer although adhesion of the coating to the surface of the methyl methacrylate polymer is not usually as good as when using a smaller proportion of vinyl acetate polymer.

The adhesion of the hot-pressed coating to the polymer surface may be considerably improved by including in the coating composition a solvent for the methyl methacrylate polymer and it is preferred to include such a solvent in the coating composition. Organic acids which have a solvent action on methyl methacrylate polymer, are suitable for this purpose; among such acids are acetic acid, formic acid, lactic acid, and phenol. Acetic acid is particularly adapted for the purpose. It will be apparent that the specific solvent selected and the proportion in which it is used in any given case, must be such that the hydrolyzed ethyl silicate and vinyl acetate polymer will be maintained in solution and deposited as a continuous film on the polymer surface being coated.

The use of acetic acid and formic acid in the solvent accelerates the gelation of the coating solution, especially if either acid is present in high concentration. The use of acetic acid, however, is especially convenient in that the coating can be dried in air with a relatively high moisture content without loss in adhesion of the coating. To obtain optimum adhesion, coating solutions containing 10% to 40% acetic acid, by weight, are preferred. Where rapid softening of the surface is desired and short dipping time can be used conveniently, more than 40% by weight of acetic acid may be used effectively. On the other hand, if long dipping periods are more convenient and drying conditions can be carefully controlled, less than 10% acetic acid is advisable. In general, retention of excess solvent in the methyl methacrylate polymer surface lowers scratch resistance and interferes with curing of the coating.

Increasing the solids content ($SiO_2$ plus partially hydrolyzed polyvinyl acetate) shortens the useful age of the coating solution but increases the thickness of the coatings obtained therefrom. For certain methods of application, it is convenient to use coating solutions containing as high as 10% solids and over in order to obtain optimum results. Extremely stable dilute coating solutions of less than 3% to 5% solids content can be used if a thin coating results in satisfactory surface properties. Optimum coating thickness, i. e., in the range of 0.9 to 2.25 microns after the coating has been cured, is most conveniently obtained from relatively stable solutions containing from 5% to 8% solids.

In operating according to this invention, the coating solution must contain the ethyl silicate hydrolyzed with at least 15%, by weight thereof, of water, and a vinyl acetate polymer. Further, the solvent vehicle must be such as to give a compatible liquid composition all components of which will remain compatible throughout the application of the coating to the surface being treated and the drying of the coating. Still further, as pointed out above, it is desirable that the solvent vehicle include a solvent for the methyl methacrylate polymer as this improves the adhesion of the hot-pressed coating to the methyl methacrylate polymer.

The problem of working out a satisfactory solvent vehicle is not difficult and well within the skill of workers in the art due to the fact that the hydrolyzed ethyl silicate, particularly when not hydrolyzed with more than 100% to 150% water, and the vinyl acetate polymer are soluble and mutually compatible in mixtures of readily available and economical, water miscible solvents and water, ethanol being the preferred solvent although other alcohols such as methanol and propanol are suitable, as well as acetone. For example, polyvinyl acetate hydrolyzed from 45% to 55% is soluble in water/ethanol mixtures in a wide range of proportions as is ethyl silicate hydrolyzed to the extent contemplated. Moreover, such methyl methacrylate polymer solvents as acetic acid are miscible with these alcohol/water mixtures and have no adverse effect on the mutual compatibility of the hydrolyzed ethyl silicate and vinyl acetate polymer.

Those skilled in the art will appreciate from the foregoing discussion that the herein considered coating solutions must be characterized by solubility of all solids in the solvent vehicle which must be so balanced as to prevent precipitation during the drying of the coating. The coating solution preferably should also contain a softening solvent for the methyl methacrylate polymer and the solids content of the solution should be adjusted to give a coating of desired thickness with the coating method to be used. In addition, it is desirable that the coating solution have good stability, that is, that it shall have prolonged life during which it is useful, before gelling.

The application of the coating solution to the methyl methacrylate polymer surface may be accomplished by brushing, spraying, squeegeeing or dipping. When objects such as plastic sheeting, are dipped in the solution, then withdrawn into the air, drained and dried, it has been found that the coating thickness may be varied between wide limits. When coatings of maximum thickness are desired, the sheets are withdrawn as rapidly as convenient at rates of several thousand inches per minute. Coatings obtained in this manner are usually several times thicker than coatings obtained by slow withdrawal of the sheet from the solution at a rate of around one inch per minute. Consequently the rate of withdrawal into air of a given composition affords an additional method of compensating for viscosity changes of the coating solution with aging and lack of reproducibility in the wetting and draining characteristics from batch to batch, so that films of constant thickness can be produced. In this connection, the optimum thickness of the final cured coating depends on the relative value of scratch resistance and weather resistance in the service conditions for which the coated object is to be used. It has been found that coatings below about 0.5 microns in thickness do not greatly improve the scratch resistance of the methyl methacrylate surface, although they are useful in lowering the reflectance of light and in making the surface antistatic, while those coatings above about 5–10 microns tend to craze readily on exposure to the weather. Both high scratch resistance and excellent weather resistance are obtained in coatings which are surprisingly thin, that is 0.8 to 5 microns.

In draining and drying the coating before curing, it is preferable to avoid exposure to air with too high relative humidity, because of possible loss of adhesion. In general, this is less than about 45% at room temperature. This is dependent, however, on the particular partially hydrolyzed polyvinyl acetate and solvents involved, as well as upon the other vapors in the air, its temperature and rate of circulation. These variables also determine whether or not the solvents are removed at relative rates necessary to maintain the solution phase.

The curing and bonding of the coating on the methyl methacrylate polymer are carried out at elevated temperature so that the desirable hardness (scratch resistance), infusibility, insolubility, and antistatic properties of vitreous $SiO_2$ can be approached more closely than is possible by low temperature processes. It has been found necessary to press the coated methyl methacrylate polymer against a rigid surface whenever it is maintained for an appreciable time above a temperature range characteristic of the base polymer and the coating composition. If this is not done, crazing in the coating and the polymer surface occurs rapidly due to shrinkage stresses in the film caused by dehydration and condensation of the coating polymers as the coating is being cured. After curing, pressure must also be applied while the coated surface is cooling, so that crazing stresses immobilized by friction and pressure against the surface are not permitted to act on the still soft methyl methacrylate surface. For these reasons it is preferred to maintain a pressure of at least 100–150 pounds per square inch when the coated surface is above about 60° C.–100° C.

Several convenient arrangements are available for carrying out the hot-pressing step, which may be performed in fluid filled autoclaves or mechanical presses; the heat transfer to the surface of the methyl methacrylate polymer may be effected by conduction or convection, or by radiation, such as by dielectric loss (induction) heating, or by infra-red heating. In preparation for this step, the coated methyl methacrylate polymer is inserted between mold surfaces of suitable shape and surface quality. These may be polished glass, metal, or even a higher softening or thermosetting resin. The molds may, of course, be merely curved or flat sheets of glass. If the assembled sandwich is to be pressed in an autoclave, the edges are first sealed with an appropriate resin or tape, or the sandwich is inserted in a bag (such as rubber or neoprene) which is evacuated. Coated panels cured by autoclave pressing at 200–225 pounds per square inch have excellent properties. The maximum pressure that can be used at a given temperature is limited only by practical considerations.

The methyl methacrylate polymer is heated to the curing temperature as rapidly as convenient and is maintained at the curing temperature (above 100° C.) for 5 to 60 minutes. The scratch resistance and hot water resistance of the coated methyl methacrylate polymer improve with increasing curing temperature. The curing time necessary to secure maximum properties at a given curing temperature decreases with higher temperatures. At 150° C., curing for about 10-15 minutes insures best results. At 190° C., curing for 5-10 minutes is adequate. At 225° C., curing less than 5 minutes is required. The advantages gained in coating properties at high temperature are partially offset by the tendency of the methyl methacrylate to flash from the mold, decompose (distill) and to develop opaque areas. After curing is complete, the sandwich is cooled by any convenient method, such as cooling the autoclave liquid or flushing the press platens with water, or, if desired, by slow cooling in the air. There is apparently little tendency for glass or metal to stick to silica/polyvinyl acetate compositions greater than 60/40 by weight when the coated panel is dried tack-free before hot-pressing. Consequently, spontaneous separation of the mold parts and the coated plastic generally occurs, due to differential contraction.

The present invention product is particularly useful for improving the scratch resistance of curved or flat methyl methacrylate polymer articles such as airplane windows and turrets, tank windows, windows for automobiles and houses and optical units such as lenses and prisms. The coatings are also useful in reducing static aberration and improving the scratch resistance of enclosures and paneling for sensitive instruments such as rate-of-climb meters, temperature indicators, radios, galvanometers, and navigation instruments. The tendency of methyl methacrylate polymer objects to acquire and retain appreciable static charges and the tendency to pick up lint and abrasive dusts is greatly diminished.

The present application is a continuation-in-part of application Serial No. 484,062 entitled "Surface characteristics of solid organic polymers" filed April 22, 1943, in the names of Paul Swithin Pinkney and the present applicant.

As many apparently widely different embodiments of this invention may be made without departing from the spirit and scope thereof, it is to be understood that the invention is not limited to the specific embodiments thereof except as defined in the appended claims.

I claim:

1. Process of providing a solid methyl methacrylate polymer with improved surface characteristics which comprises applying to a surface of said polymer a coating solution comprising ethyl silicate hydrolyzed with at least 15%, by weight thereof, of water, and a partially hydrolyzed vinyl acetate polymer in a proportion of 1 part, by weight, to 1-99 parts of ethyl silicate calculated as $SiO_2$, drying said surface, and heating said surface at elevated temperature while pressed against a rigid surface to cure the coating thus formed and bond same to said surface of said polymer.

2. Process of providing a solid methyl methacrylate polymer with improved surface characteristics which comprises applying to a surface of said polymer a coating solution comprising ethyl silicate hydrolyzed with at least 20%, by weight thereof, of water, and partially hydrolyzed polyvinyl acetate in a proportion of 1 part, by weight, to 1-99 parts of said ethyl silicate calculated as $SiO_2$, drying said surface, and heating said surface at 100° C.-225° C. while pressed against a rigid surface to cure the coating thus formed and bond same to said surface of said polymer.

3. Process of providing a solid methyl methacrylate polymer with improved surface characteristics which comprises applying to a surface of said polymer a coating solution comprising ethyl silicate hydrolyzed with at least 20%, by weight thereof, of water, partially hydrolyzed polyvinyl acetate in a proportion of 1 part, by weight, to 1.5-9 parts of said ethyl silicate calculated as $SiO_2$, and a solvent for methyl methacrylate polymer, drying said surface, and heating said surface at 100° C.-225° C. while pressed against a polished rigid surface under a pressure of at least 150 pounds per square inch to cure the coating thus formed and bond same to said surface of said polymer.

4. Process of providing a solid methyl methacrylate polymer with improved surface characteristics which comprises applying to a surface of said polymer a coating solution comprising ethyl silicate hydrolyzed with 20% to 75%, by weight thereof, of water, and polyvinyl acetate hydrolyzed from 45% to 55% in a proportion of 1 part, by weight, to 1.5-9 parts of said ethyl silicate calculated as $SiO_2$, drying said surface, and heating said surface at 100° C.-225° C. while pressed against a polished rigid surface under a pressure of at least 150 pounds per square inch to cure the coating thus formed and bond same to said surface of said polymer.

5. Process of providing a solid methyl methacrylate polymer with improved surface characteristics which comprises applying to a surface of said polymer a coating solution comprising ethyl silicate hydrolyzed with 20%-75%, by weight thereof, of water, polyvinyl acetate hydrolyzed from 45%-55% in a proportion of 1 part, by weight, to 1.5-9 parts of said ethyl silicate calculated as $SiO_2$, and 10%-40%, by total weight of said solution, of a solvent for methyl methacrylate polymer, drying said surface, and heating said surface at 100° C.-225° C. while pressed against a polished rigid surface under a pressure of at least 150 pounds per square inch to cure the coating thus formed and bond same to said surface of said polymer.

6. Process of providing a solid methyl methacrylate polymer with improved surface characteristics which comprises applying to a surface of said polymer a coating solution comprising ethyl silicate hydrolyzed with 20%-75%, by weight thereof, of water, polyvinyl acetate hydrolyzed from 45%-55% in a proportion of 1 part, by weight, to 2-6 parts of said ethyl silicate calculated as $SiO_2$, and 10%-40%, by total weight of said solution, of acetic acid, drying said surface, and heating said surface at 100° C.-225° C. while pressed against a polished rigid surface under a pressure of at least 150 pounds per square inch to cure the coating thus formed and bond same to said surface of said polymer.

7. A solid methyl methacrylate polymer having bonded thereto a scratch resistant surface film of 0.5-10 microns in thickness, said film having been deposited from a solution comprising ethyl silicate hydrolyzed with at least 15%, by weight thereof, of water, and a partially hydrolyzed vinyl acetate polymer in a proportion of 1 part, by weight, to 1-99 parts of said ethyl silicate calculated as $SiO_2$, and having been cured at an elevated temperature.

8. A solid methyl methacrylate polymer having bonded thereto a scratch resistant and weather resistant surface film of 0.8–5 microns in thickness, said film having been deposited from a solution comprising ethyl silicate hydrolyzed with 20%–75%, by weight thereof, of water, and partially hydrolyzed polyvinyl acetate in a proportion of 1 part, by weight, to 1.5–9 parts of said ethyl silicate calculated as $SiO_2$, and having been cured at a temperature of 100° C.–225° C.

9. A solid methyl methacrylate polymer having bonded thereto a scratch resistant and weather resistant surface film of 0.8–5 microns in thickness, said film having been deposited from a solution comprising ethyl silicate hydrolyzed with 20%–75%, by weight thereof, of water, and polyvinyl acetate hydrolyzed from 45%–55% in a proportion of 1 part, by weight, to 2–6 parts of said ethyl silicate calculated as $SiO_2$, and having been cured at a temperature of 100° C.–225° C.

MAX FREDRICK BECHTOLD.